Dec. 4, 1928.  
A. WUEST  
1,693,741  
LIQUID FILTER  
Filed May 23, 1927
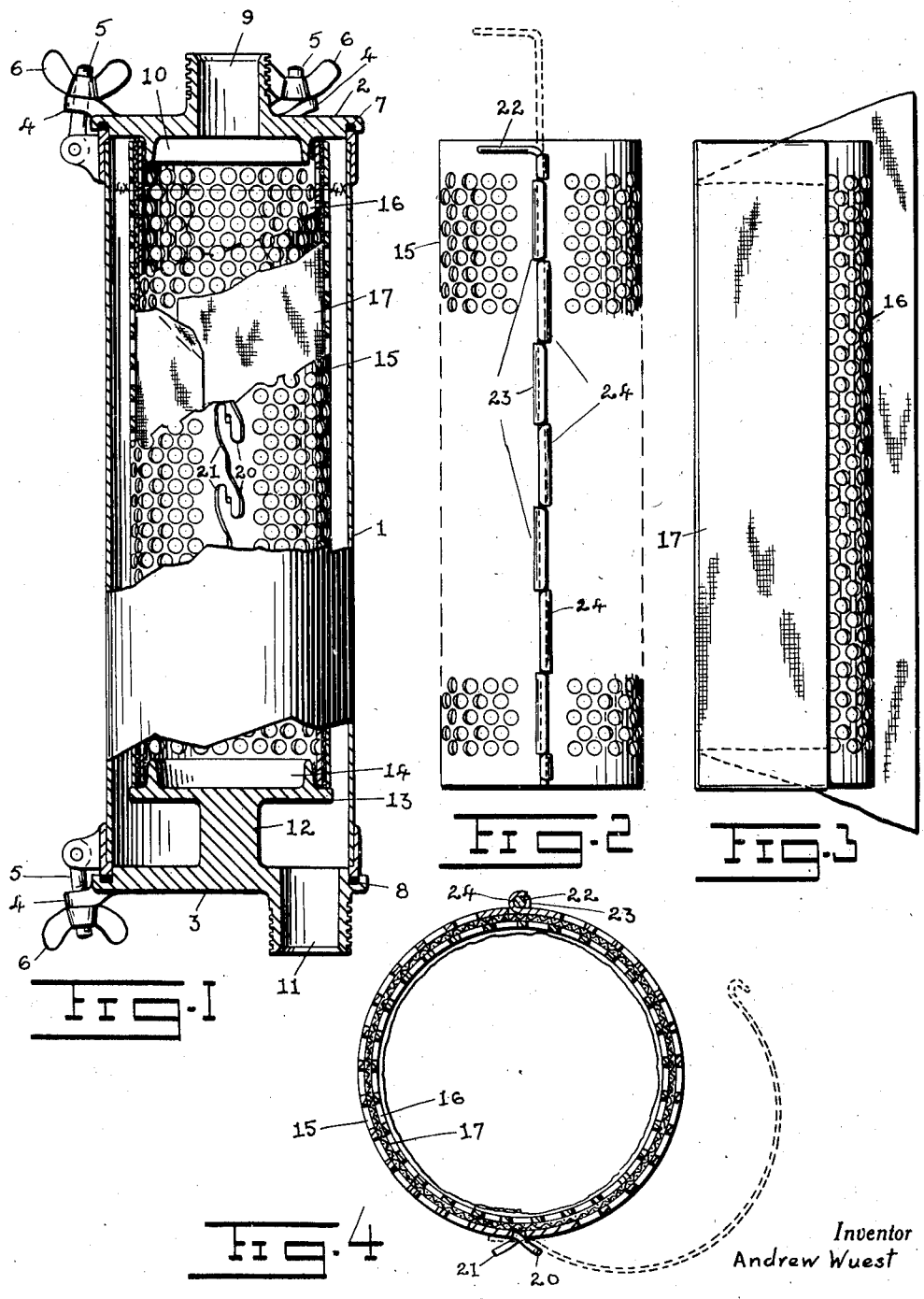
Inventor  
Andrew Wuest  
By Frank Keiper  
Attorney Patented Dec. 4, 1928.

1,693,741

UNITED STATES PATENT OFFICE.

ANDREW WUEST, OF ROCHESTER, NEW YORK.

LIQUID FILTER.

Application filed May 23, 1927. Serial No. 193,483.

This invention relates to milk filters especially those filters that are used in filtering the milk after it has passed thru the heating apparatus and before it is pumped into the cooling apparatus during the pasteurizing process. The object of the invention is to so construct this type of filter that it can be readily and quickly taken apart and cleaned and the filtering cloth replaced at a minimum cost.
These and other objects of this invention will be fully illustrated in the drawing, described in the specification and pointed out in the claims at the end thereof.

In the accompanying drawing:
Figure 1 is a partial elevation and sectional view of the milk filter.

Figure 2 is an elevation of one of the outer cylindrical filtering screens used in the filter.

Figure 3 is an elevation of the inner cylindrical filtering screen and the filtering cloth surrounding it.

Figure 4 is a horizontal sectional view of the filtering cylinders and filtering cloth held in place between them, the section being taken on the line 4*x*—4*x* of Figure 1.

In the several figures of the drawing like reference numerals indicate like parts.

The filter forming the subject matter of this invention is especially adapted for use in a milk pasteurizing plant and is placed between the heating apparatus and the cooling apparatus so that the milk is filtered during the pasteurizing process before it is cooled. The filter is so constructed that it can be placed into the pipe line in the vertical position in which it is illustrated in Figure 1 or in a horizontal position and secure the same high efficiency in its use in either position. Another feature of the filter is the use of a straight piece of filtering cloth instead of a sack that is needed in the filters that are now used for filtering milk.

As illustrated in the figures of the drawing, the filter comprises a cylindrical shell or casing 1. To the ends of this shell are clamped the heads 2 and 3 which for this purpose are provided with a series of bifurcated lugs 4, 4 into which the clamping bolts 5, 5 provided on the outside of the shell 1 can engage. Each of the clamping bolts 5, 5 has a thumb nut 6 threaded thereon by means of which the heads 2 and 3 are drawn against the ends of the shell 1 until the rubber packing rings 7 and 8 provided in the heads 2 and 3 form a liquid tight joint between the heads and the ends of the shell.

The inlet 9 for the filter is provided in the head 2 and is located in the center thereof. A sanitary pipe thread is formed on the outside of the nipple surrounding the inlet so that a connecting sleeve can be threaded thereon to connect the inlet of the filter into the pipe line. On the inside of the head 2 is provided an annular concentric shoulder or flange 10 on which the filtering unit hereinafter described is centered and held in place. The outlet 11 is provided in the head 3 but is located eccentrically thereon and adjacent to the inside wall of the shell 1. The outlet is located in this way so that when the filter is used in a horizontal position the outlet can be placed in line with the bottom of the horizontally placed shell in which all of the milk will drain out of the shell as no dead space or pocket is formed behind the outlet.

On the inside of the head 3 and centrally thereof is formed a pedestal 12 and on the platform 13 of this pedestal is formed another annular concentric shoulder or flange 14. The opposite end of the filtering unit that will now be described telescopes over the shoulder 14 to hold the filtering unit in place between the heads 2 and 3 concentrically within the shell 1.

The filtering unit comprises an outer cylindrical filtering screen 15, an inner cylindrical filtering screen 16 and filtering cloth 17 wound around the inner screen and held in place thereon by the outer screen which surrounds it. Both the outer and inner cylindrical screens are preferably made up from perforated sheet metal. The inner screen is made in one piece and the filtering cloth is placed around it as illustrated in Figure 3 so that the ends of the filtering cloth overlap each other while the top and bottom of the filtering cloth that projects above and below the cylinder is tucked into the inside of the cylinder screen. The outer cylinder screen is then placed around the inner screen and filtering cloth. This outer cylinder is divided into two sections in order to allow the insertion of the inner cylinder and filtering cloth into the inside of the outer cylinder screen. Two locking joints are provided to lock the two sections of the outer cylinder screen together. One of these locking joints is formed by a series of interlocking lugs 20 and 21, lugs 20 being formed on one section of the screen and lugs 21 being formed on the other section of the screen. The lugs are hook shaped and are duplicates of each other except that lugs 20 project downwardly from the section of the screen on which they are formed while the lugs 21 project upwardly from its section. Both the lugs 20 and 21 project outwardly at an angle to their respective screen sections and are so arranged on their respective sections that the lugs of one section hook into the lugs of the other section and thus interlock with each other and hold one side of the sections together. The interlocking joint thus formed on one side of the outer cylinder screen permits a limited movement of one of the sections with relation to the other as illustrated in dotted lines in Figure 4, so that when one of the sections of the outer cylinder screen is placed against the filtering cloth and the inner filtering cylinder, the other section of the outer cylinder screen may be readily locked to the first section by means of the interlocking lugs 20 and 21 in the manner above described without interfering with the filtering cloth. After the sections are interlocked by means of the lugs 20 and 21 the section not yet in contact with the filtering cloth may be swung against it until the filtering cloth is completely embraced by both sections of the outer cylinder screen. The remaining open joint between the section of the outer cylinder screen is then locked together by means of the locking rod 22. This locking rod engages into the vertical channels 23 and 24 which are alternately formed along the free edges of the sections of the outer cylinder screen. These channels engage between each other as the sections of the cylinder screen are brought together until the channels 23 on one section are in line with the channels 24 of the other section so that on the insertion of the locking rod 22 into these consecutive channels the ends of the sections are held together and complete the outer cylinder screen.

When the outer cylinder screen, filtering cloth and inner cylinder screen are thus brought together the filtering cloth is firmly held in place between the screens and completes the filtering unit that is now ready to be inserted into the shell 1. For this purpose one end of the filtering unit is first telescoped over the annular shoulder or flange 14 of the head 3. When this is done and the filtering unit is properly supported on the head 3, the shell 1 is slipped over the filtering unit until the end of the shell engages the head and can be temporarily clamped in place thereon by means of the clamping bolts 5 and thumb nuts 6. The head 2 is then placed over the shell 1 so that the annular flange 10 telescopes into the inside of the filtering unit and will hold the other end of the filtering unit centrally of the shell 1 after the head 2 is clamped in place on the shell by its clamping bolts 5 and thumbnuts 6. After the heads 2 and 3 are thus properly located and clamped in place and support the filtering unit centrally within the shell, all of the thumb nuts are tightened. The filter is then ready to be inserted into the pipe line by means of suitable threaded sleeves that connect the inlet and outlet with the ends of the pipe line.

In filtering the milk passes thru the inlet 9 into the inside of the inner cylinder screen from where it filters thru the filtering cloth and the outer cylinder screen into the space provided between the inside of the shell and the filtering unit and then drains out thru the outlet 11 provided in the head at the opposite end of the shell. After the pasteurizing process is completed the filter is disconnected from the pipe line, opened up and cleaned and a new filtering cloth inserted between the cylindrical screens. This is done very easily and quickly as appears from the above description and the fact that only a straight piece of filtering cloth is needed also makes it very inexpensive to replenish the filtering medium.

It will also be understood that this filter can be used to filter cold milk and can be used to filter cold milk before the process of pasteurizing it has been begun.

I claim:

1. A liquid filter having a filtering unit comprising an inner cylinder filtering screen, a filtering medium supported on said inner cylinder filtering screen, an outer cylinder filtering screen made up of a pair of trough sections downwardly projecting hook shaped interlocking lugs provided along one edge of one of said trough sections, upwardly projecting hook shaped interlocking lugs provided along the opposing edge of the other of said trough sections, said interlocking lugs being adapted to hook into each other and hold said trough sections together on one side, and locking means provided along the edges on the other side of said trough sections to close said trough sections into the outer cylinder screen to embrace the filtering medium supported on said inner filtering screen.

2. A liquid filter comprising an outlet shell having an inlet and an outlet, a filtering unit mounted within said outer shell and connected to said inlet, said filtering unit comprising an inner rigid filtering screen and an outer rigid filtering screen with a flexible filtering medium held in place around the outside of said inner filtering screen by said outer filtering screen, said outer filtering screen being divided longitudinally into two opposing trough sections and means provided along one of the dividing lines of said outer filtering screen to allow said sections to swing open for the insertion of the filtering medium and means provided along the other of said dividing lines to lock said trough sections in place over said filtering medium and hold said filtering medium in place over the surface of said inner rigid filtering screen.

3. A liquid filter comprising an outer shell having an inlet and an outlet, a filtering unit mounted within said shell and connected to said inlet, said filtering unit comprising an inner rigid screen and an outer rigid screen with a filtering medium in place between said inner and said outer filtering screen, said outer rigid screen being divided into a pair of longitudinal troughs, angularly projecting and vertically hook shaped locking members provided along one edge of each of said trough shaped sections, said hook shaped locking members being adapted to interlock with each other and allow a lateral swinging motion of said trough sections with relation to each other, horizontally hook shaped interlocking members along the other edges of each of said trough sections adapted to laterally engage between one another and prevent an endwise movement of said trough sections with relation to each other and a sliding locking rod adapted to alternately engage said horizontally hook shaped interlocking members to hold said trough sections locked together with said filtering medium located between said outer and said inner rigid filtering screen.

In testimony whereof I affix my signature.

ANDREW WUEST.